United States Patent

[11] 3,616,085

[72] Inventor Gerhard Printz
    Vienna, Austria
[21] Appl. No. 795,216
[22] Filed Jan. 30, 1969
[45] Patented Oct. 26, 1971
[73] Assignee Semperit Osterreichisch-Amerikanische
    Gummwerke Aktiengesellschaft
    Vienna, Austria

[54] DEVICES FOR JOINING SINGLE FABRIC STRIPS
    7 Claims, 2 Drawing Figs.
[52] U.S. Cl. .................................................. 156/517,
    156/405, 156/507, 156/512
[51] Int. Cl. .................................................. B29h 17/02,
    B32b 31/04

[50] Field of Search ........................................... 156/405,
    406, 502, 504, 507, 512, 517, 518, 571; 26/7

[56] References Cited
    UNITED STATES PATENTS
    2,962,083  11/1960  Hasselquist ................. 156/512
    3,192,094   6/1965  Phillips et al. ................. 156/512 X Primary Examiner—Benjamin A. Borchelt
Assistant Examiner—James M. Hanley
Attorney—Ernest F. Marmorek ABSTRACT: Apparatus for joining diagonally cut flanks of rubberized fabric with a small overlap including a pivotable suction device provided for lifting flanks, a conveyor belt upon which flanks are deposited and a roller pair near one end of the conveyor belt to press cut overlapping flanks together.

PATENTED OCT 26 1971                    3,616,085
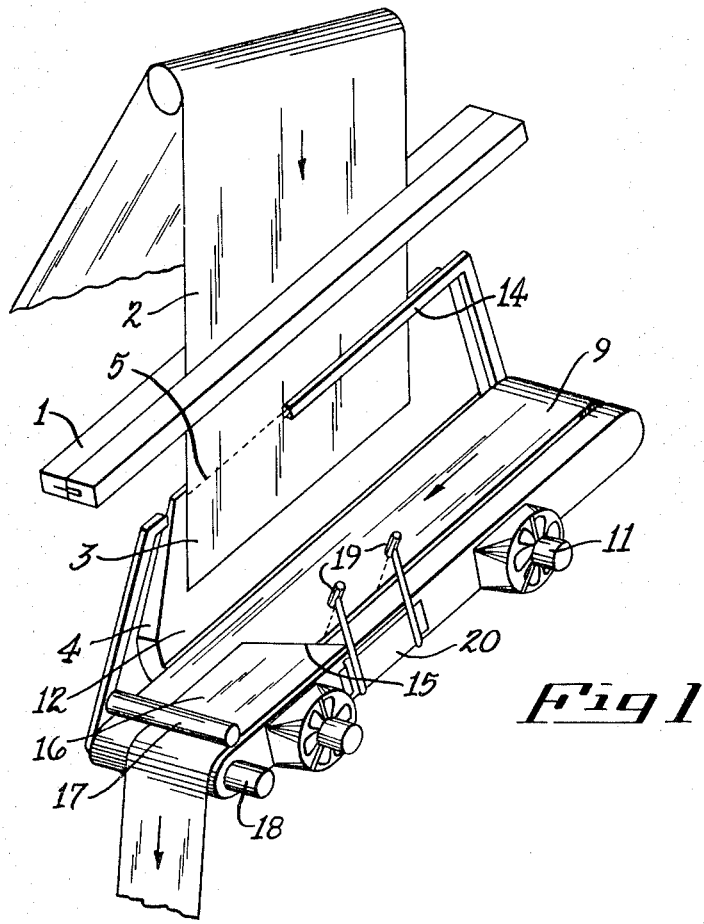
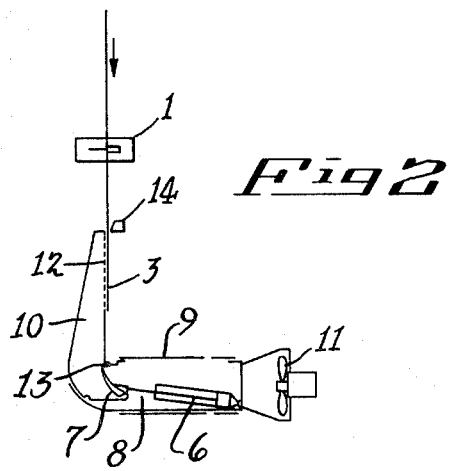
INVENTOR:
GEHARD PRINTZ,
BY *Ernest A. Marmorek,*
HIS ATTORNEY.

DEVICES FOR JOINING SINGLE FABRIC STRIPS

The invention relates to a device for joining single fabric strips and is particularly concerned with the joining of diagonally cut flanks of rubberized fabric or the like with a small overlap, in which a pivotable suction device is provided for lifting the flanks and a conveyor belt is provided upon which the flanks are deposited.

In a known cutting device, the cut flanks are lifted by means of a suction device and are brought to a conveyor belt on which the flank is deposited by cutting off the suction. The suction device is arranged at the end of an arm mounted to pivot about a horizontal axis. After picking up the flank, the arm is pivoted through 90°. Thereafter the flank is deposited on the conveyor belt, and is transported through a distance such that the next flank to be deposited overlaps it a little. This system requires a great deal of space which is dependent upon the pivot range of the arm, which in turn is dependent upon the size of the flanks. The pivoting angle must be exactly adhered to, since otherwise faulty overlappings result. The system is thus very complex and expensive in its construction.

An object of the invention is to provide a device, in which the inaccuracies resulting from the taking up and pivoting of the flanks are avoided.

The invention consists in a device for joining single fabric strips with a small overlap and provided with a pivotable suction device for lifting the flanks and a conveyor belt upon which the flanks are deposited, wherein said suction device consists of a flap arranged on one side of the cut flank at the output of the cutting device, which flap has a porous surface and is pivotable about an axis lying parallel to the flank and wherein said conveyor belt is also parallel to said axis.

Such a device ensures an exact joining of the fabric strips in considerably shorter time and requires only a small amount of space.

In a vertical cutting machine, the flap can be pivotable through 90°, the conveyor belt being arranged horizontally which is very convenient for the further treatment of the joined strip. In order to prevent slipping of the flanks on the conveyor belt, particularly during the overlapping process, this may also be put under suction. At the end of the conveyor belt, pressing or clamping rollers may be arranged for pressing together the overlapped parts.

An exemplary embodiment of the invention will now be described with reference to the accompanying drawing in which:

FIG. 1 is a perspective view of the device invention on a vertical cutting machine; and FIG. 2 is a schematic cross section through the device shown in FIG. 1.

The vertical cutting machine for the fabric 2 includes a measuring beam 1 having cutting and clamping means and when the clamp is released, the material is transported downwards by the predetermined flank length. Due to the function of the measuring beam 1, the cut off flank 3 does not fall down after the clamp is opened, but remains adhering to the uncut fabric 2 even after the transport has occurred. The flank hangs in front of a flap 4 which is vertical when in the starting position, the cut line 5 being located at the top edge of the flap 4. When the clamp closes again before the next cutting, the flank transfer operation is initiated by limit switches (not shown). Pistons 6 are now caused to move forwards to open flaps 7 so that a space 8 under a conveyor belt 9 is connected with a hollow space 10 in the flap 4. In this way the same suction as is constantly maintained under the conveyor belt 9 by fans 11, is present in the flap 4.

The flap 4 possesses a perforated and preferably porous surface 12 on the side facing the flank 3 which is now sucked up. As the pistons 6 continue to move forward, the flaps 7 bear on the flap 4 which is thereby tipped forward about an axis 13 lying parallel to the flank. The flank 3 is then peeled off by a bar 14 from the remaining rubberized material 2 at the cut edge 5 and is deposited on the conveyor belt 9 which is stationary at this time.

Just before the flap 4 deposits the flank 3 on the conveyor belt 9, the stroke of the piston 6 is completed and the flaps 7 close since the flap 4 continues to move due to its momentum. The pressure in the flap hollow space 10 thus returns to atmospheric and the flank sticking to the flap 4 is freed. The conveyor belt which is also perforated now sucks up the flank 3, which has been placed over the end 15 of the previous flank 16 lying on the conveyor belt 9, with a small overlap. Immediately afterwards, the piston 6 is reversed, so that the flap 4 is moved upwards again, in order to be ready for receiving the next flank which has in the meantime been cut. At the same time, the conveyor belt transports the last deposited flank so that its rear end lies just to the rear of that position, at which the front end of the next flank will lie when deposited on the belt 9.

By repeating the operation, the front end of the next cut flank is deposited a few millimeters over the rear end of the flank previously deposited on the conveyor belt. In further sequence, the flanks pass through a pressure roller 17 applied at the end of the conveyor belt, whereby their ends are joined. In order to be able in fact to limit the overlap of the flanks to a few millimeters a very accurate conveyor belt-braking device 18 controlled by the end of each moving flank is provided. The necessary impulse switches 19 are mounted on a slide 20 so that the stopping point can be set to correspond to the position of the edge 15 of the moving flank. Alternatively this setting can be carried out automatically by means of a known edge control.

If the joining of the flanks is not achievable by means of a simple pressing together, an adhesive-applying device and/or a sewing machine can be provided for the flank ends 15.

Only one exemplary embodiment of the device has been described but modifications may be introduced. For example the conveyor belt can easily be designed to be hinged.

I claim:

1. A machine for overlapping and connecting cut strips, comprising in combination:
   conveyor belt means operable to receive and transport said cut strips;
   a walled movable flap means disposed adjacent said belt means, said flap means being movable between a first position wherein it is operative to receive said cut strips and, respectively, a second position substantially parallel to said conveyor belt means wherein it is operable to deposit said cut strips thereon;
   adhesion-generating means communicating with a lower portion of said conveyor belt means and selectively with said flap means;
   said adhesion-generating means when activated being operative to impart an adhesive effect constantly to said lower belt portion and intermittently to said flap means; whereby when said flap means is spaced from being near said second position said adhesive effect will be operative for said flap means and said flap means will hold the cut strips received thereon and, respectively, when said flap means is near said second position said adhesive effect on said flap means will be interrupted and thereby said cut strips be deposited onto said conveyor belt means and due to the constant adhesive effect thereon, be held firmly thereon;
   control means disposed near said flap means and being operable to establish and, respectively, to interrupt the communication between said adhesion-generating means and said flap means; and
   roller means disposed near one end of said conveyor belt and operative to press said cut overlapping strips together.

2. A machine, as claimed in claim 1, wherein the first position of said flap means is substantially vertical and the second position is substantially horizontal.

3. A machine, as claimed in claim 1, wherein said conveyor belt moves in a direction substantially parallel to the cut edges of said strip.

4. A machine for overlapping and connecting cut strips, comprising in combination:

conveyor belt means operable to receive and transport said cut strips;

a walled movable flap means disposed adjacent said belt means, said flap means being movable between a first position wherein it is operative to receive said cut strips and, respectively, a second position substantially parallel to said conveyor belt means;

adhesion-generating means communicating with a lower portion of said conveyor belt means and when activated being operative to impart an adhesive effect to both said lower belt portion and said flap means; and roller means disposed near one end of said conveyor belt and operative to press said cut overlapping strips together, said flap means define an internal chamber, said adhesion-generating means communicating with said internal chamber and being operative to impart an adhesive effect to both said lower belt portion and said chamber of said flap means, said flap means having a porous surface, the pores of said surface providing communication between said surface and the chamber, said surface when said adhesion-generating means are activated being operable to hold succeeding cut strips in said first position and subsequently to transfer in said second position said strips to said conveyor belt means in overlapping relation.

5. A machine, as claimed in claim 4, wherein said uncut strips move in a direction substantially perpendicular to the plane of said cut strips.

6. A machine, as claimed in claim 4, and means to activate and deactivate said adhesion-generating means.

7. A machine, as claimed in claim 4, said belt being porous, said adhesion-generating means including suction means disposed below said lower belt portion generating a suction effect through said lower belt portion when activated, to attract and to hold until deactivated said strips.